United States Patent
Yamat et al.

(10) Patent No.: US 9,779,073 B2
(45) Date of Patent: Oct. 3, 2017

(54) DIGITAL DOCUMENT CHANGE CONFLICT RESOLUTION

(71) Applicant: Microsoft Corporation, Redmond, WA (US)

(72) Inventors: James Yamat, Redwood City, CA (US); Robert R. Klingenberg, San Carlos, CA (US); Evelyn G. Salazar, Sunnyvale, CA (US); Andrey A. Efimchik, Sunnyvale, CA (US); Jonathan Rutherfurd, Redmond, WA (US); Yanling Wang, Belmont, CA (US); Shawn Villaron, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 14/445,787

(22) Filed: Jul. 29, 2014

(65) Prior Publication Data
US 2016/0034433 A1    Feb. 4, 2016

(51) Int. Cl.
| | | |
|---|---|---|
| G06F 17/24 | (2006.01) |
| G06F 17/22 | (2006.01) |
| G06F 17/21 | (2006.01) |
| G06F 3/0484 | (2013.01) |

(52) U.S. Cl.
CPC ...... *G06F 17/2288* (2013.01); *G06F 3/04842* (2013.01); *G06F 17/211* (2013.01); *G06F 17/2211* (2013.01)

(58) Field of Classification Search
None
See application file for complete search history.

(56) References Cited

U.S. PATENT DOCUMENTS

| | | | |
|---|---|---|---|
| 7,124,362 B2 | 10/2006 | Tischer | |
| 8,352,870 B2 | 1/2013 | Bailor et al. | |
| 8,417,666 B2 | 4/2013 | Bailor et al. | |
| 8,434,002 B1 | 4/2013 | Shah et al. | |
| 8,453,052 B1 | 5/2013 | Newman et al. | |
| 2007/0283322 A1* | 12/2007 | Hsu | G06F 8/34 717/113 |
| 2009/0327358 A1* | 12/2009 | Lukiyanov | G06F 17/30038 |

(Continued)

OTHER PUBLICATIONS

Puttaswamy, et al., "Docx2Go: Collaborative Editing of Fidelity Reduced Documents on Mobile Devices", In Proceedings of the 8th International Conference on Mobile Systems, Applications, and Services, Jun. 15, 2010, pp. 345-356.

*Primary Examiner* — Asher Kells (57) ABSTRACT

A first set of changes to a first version of a digital document, as compared to a baseline version of the document, can be detected. The first set of changes can include a first change to a page of the document in the first version of the document, as compared to the baseline version of the document. Also, a second set of changes to a second version of a document, as compared to the baseline version of the document, can be detected. The second set of changes can include a second change to the page of the document in the second version of the document, as compared to the baseline version of the document. A conflict between the first change and the second change can be detected, and the conflict can be resolved by receiving user input or applying conflict resolution rule(s) to choose between the first and second changes.

20 Claims, 7 Drawing Sheets (56) References Cited

U.S. PATENT DOCUMENTS

| | | | |
|---|---|---|---|
| 2010/0257457 A1* | 10/2010 | De Goes | G06Q 10/10 715/751 |
| 2011/0029594 A1 | 2/2011 | Rees et al. | |
| 2011/0302479 A1* | 12/2011 | Movida | G06F 11/0709 714/798 |
| 2012/0101980 A1 | 4/2012 | Taleghani et al. | |
| 2013/0262373 A1 | 10/2013 | Rampson | |

* cited by examiner

DIGITAL DOCUMENT CHANGE CONFLICT RESOLUTION

BACKGROUND

Active coauthoring of cloud stored digital documents is a situation in computer systems where multiple computer system clients (e.g., smartphones, tablet computers, laptop computers, desktop computers, etc. that are connected to a server through a computer network) are allowed to make changes to a document at the same time. The changes from the clients are communicated from the clients to a server, which may be a single computing machine or a group of computing machines, such as one or more computer clusters. The server updates an authoritative server version of the document with the changes from the clients. For example, a client may communicate a list of one or more changes to the server, or a client may send a copy of its current version of the document. Some such systems may allow clients to perform offline editing, where a client can edit its local copy of the document even though the client is not currently connected to the server. In such a scenario, when the client is re-connected to the server, the client can communicate to the server the changes that were made while the client was offline (not connected to the server). Other systems support only real-time coauthoring, where clients are only able to make changes to the document while the clients are connected to the server. In such systems, changes are typically communicated from the client to the server as the changes are made.

SUMMARY

In one aspect, the tools and techniques discussed herein can include detecting a first set of changes to a first version of a digital document, as compared to a baseline version of the document. The first set of changes can include a first change to a page of the document in the first version of the document, as compared to the baseline version of the document. Also, a second set of changes to a second version of a document, as compared to the baseline version of the document, can be detected. The second set of changes can include a second change to the page of the document in the second version of the document, as compared to the baseline version of the document. A conflict between the first change and the second change can be detected, and the conflict can be resolved by receiving user input or by applying conflict resolution rule(s) to choose between the first and second conflicts.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Aspects described herein are directed to techniques and tools for improved resolution of conflicting changes to digital documents. Such improvements may result from the use of various techniques and tools separately or in combination.

The conflict resolution tools and techniques may be used in the context of active document coauthoring. During active document coauthoring of cloud stored digital documents, users can run into conflicts while trying to modify certain content or content properties at the same time. A conflict is where there are multiple changes to the document that will not all be made to the document due to differences between the changes. Different systems may have different rules for determining when conflicts exist between changes, such as a rule that when the same document property is changed to different values by different changes, then the changes conflict with each other. For instance, one author on one client may move a shape to the right while another author on another client moves that same shape to the left. This can result in the client who saves to the server last encountering a conflict between that client's change and the change that has already been made at the server to save the other client's change. Different systems can take different approaches to deal with such conflicts. For example, when a conflict occurs, a system may allow the user who saves last to choose whether to accept that user's conflicting change or the change made by the other user. Other systems may take a "last person wins" approach, where the change from last person to save is automatically accepted and applied to the authoritative version of the document.

Techniques and tools discussed herein may include auto-resolving certain types of conflicts (automatically resolved conflicts), and only presenting users with other types of conflicts (such as conflicts that could cause significant data loss). Also, these other conflicts (manually resolved conflicts) may be presented to a user to prompt for user input as to which of the conflicting changes to apply, and this may be done in a way that is intuitive and simplified. For example, in a slide presentation application, the application on the client can present a visual slide comparison showing two versions of a slide, one that reflects the end state of the slide with changes from the current server version for the manually resolved conflicts, and another that reflects the end state of the slide with changes from the current client version for the manually resolved conflicts. Accordingly, when the user encounters conflicts that require manual resolution, the side-by-side slide comparison of both the local user's changes and the ones made by other authors can make this experience simple and easy to understand. This approach can allow the user to readily see the end result of either set of manually resolved changes, make a simple selection decision, and provide user input to indicate that selection. Accordingly, these features of the manual resolution of some changes can improve the function of the computer system by improving the usability and efficiency of conflict resolution. Additionally, computer logic implemented in computer hardware can auto-resolve certain types of conflicts, such as conflicts that are deemed less risky in terms of data loss and/or conflicts that are more difficult to effectively present to a user. This way the user can encounter conflicts to resolve manually less often, which can also improve a computer system's usability and efficiency in performing conflict resolution.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
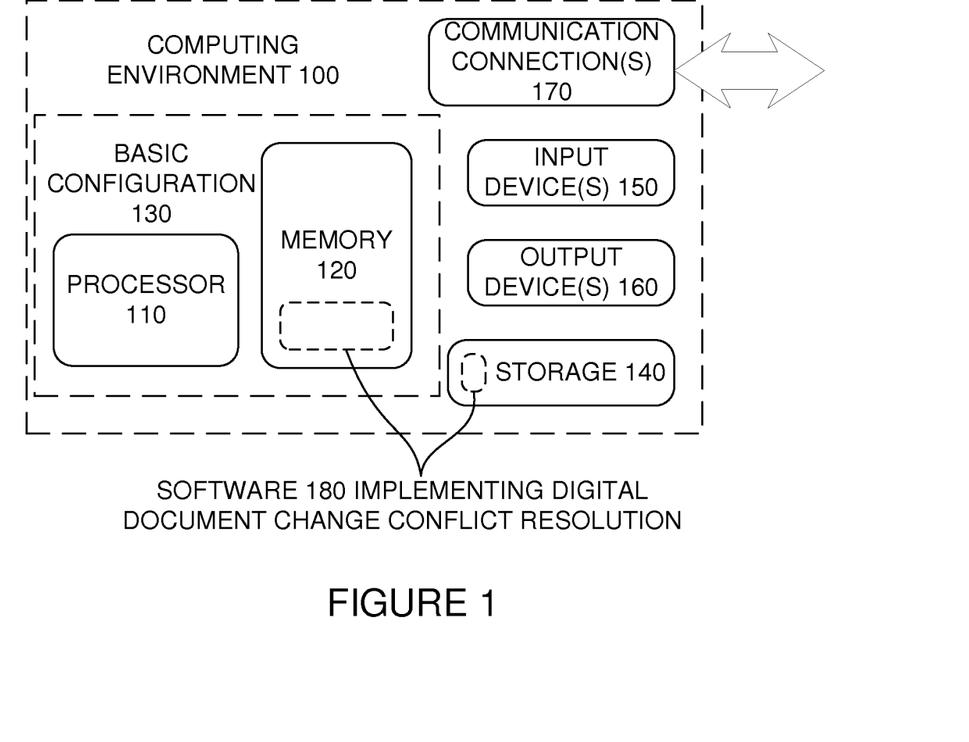
FIG. 1 is a block diagram of a suitable computing environment in which one or more of the described aspects may be implemented.

FIG. 1 illustrates a generalized example of a suitable computing environment (100) in which one or more of the described aspects may be implemented. For example, one or more such computing environments can be used as a document coauthoring client or a document coauthoring server. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing resolution of conflicting changes to digital documents. An implementation of resolving changes to digital documents may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Digital Document Change Conflict Resolution System and Environment

Figure 2:
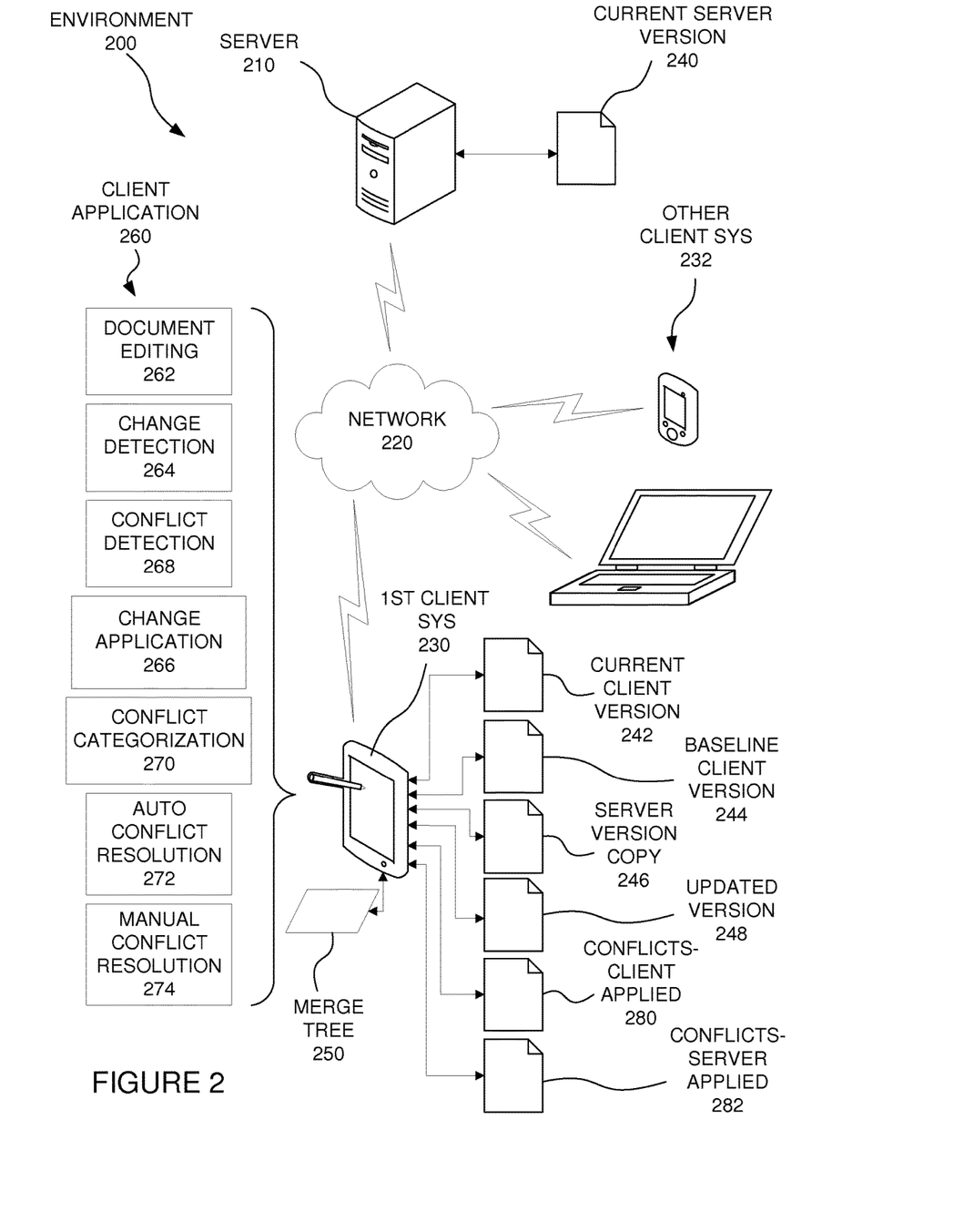
FIG. 2 is a schematic diagram of a digital document change conflict resolution computing environment.

FIG. 2 is a schematic diagram of an environment (200) in conjunction with which one or more of the described aspects may be implemented. The environment (200) can include a server (210) connected to a computer network (220), which can in turn connect the server (210) with a first client system (230) and with one or more other client systems (232). For example, the server (210) and the client systems (230 and 232) may each include computer components such as those discussed above with reference to FIG. 1.

The server (210) can maintain a current server version (240) of a digital document, such as a photography editing document, an illustration document, a slide presentation document, a word processing document, a Web page, etc. Such a document can include one or more pages. As used herein, a page is all or part of a digital document that is configured to be displayed in a continuous layout, such as a digital photograph or graphic design layout in a photography editing document, an illustration page in an illustration document, a slide in a slide presentation document, a page in a word processing document, a Web page, etc. The digital document can include graphical elements (visual elements that are not purely textual), such as shapes in a slide presentation document. The digital document may be formatted in any of various ways, such as in a hierarchical organization, such as a tree organization. The digital document may be in the form of a markup language such as HTML or XML.

While computing components and functionality will be discussed below with reference to the first client system (230), similar functionality may be present in the other client systems (232) as well. When the first client system (230) is to begin viewing and/or editing the document, the first client system (230) can request the current server version (240). The first client system (230) can save a copy of that current server version (240) as the current client version (242) and another copy as the baseline client version (244). During save and/or conflict resolution operations, the first client system (230) can also host other document versions, such as a server version copy (246) of the document, an updated version (248) of the document, and a merge tree (250), as discussed more below.

The first client system (230) can host a client application (260), which can allow user input to edit the current client version (242) of the document and to interact with the server to save an updated version (248) of the document. The client application (260) can include software and/or hardware components running in conjunction with each other. Some or all of the application (260) may be implemented in hardware, such as in one or more system-on-a-chip implementations. The client application (260) can include multiple components. Alternatively, some or all of these components may be hosted on the server (210), or in some other computing system that is connected to the first client system (230).

The client application (260) can include components such as a document editing component (262), a change detection component (264), a conflict detection component (268), a change application component (266), a conflict categorization component (270), an automatic conflict resolution component (272), and a manual conflict resolution component (274). The client application (260) may also include other components that are not shown, and the components may not be distinctly separated, but may be combined in various forms.

The document editing component (262) can include document editing features for editing the current client version (242) of the document. For example, this may include editing features for editing word processing documents, graphical illustration documents, slide presentation documents, etc. in response to user input.

The change detection component (264) can detect when changes have been made to the current client version (242) and/or the current server version (240), as a compared to the baseline client version (244), so that such changes can be to be merged together in the updated version (248). The baseline client version (244) can represent the state of the document when the current client version (242) and the current server version (240) were the same version, such as at the conclusion of the last save operation involving the first client system (230), or the last time the first client system (230) retrieved the document from the server (210).

The merging together of changes, as discussed herein, may occur as part of a save operation, such as an automatic save operation or a save operation initiated in response to user input. During such an operation, the change detection component (264) may retrieve the current server version (240) from the server (210) and save the retrieved version as the server version copy (246) on the first client system (230) for use in detecting changes made to the current server version (240). The change detection component (264) can parse and compare the server version copy (246) with the baseline client version (244) to detect changes made to the current server version (240), as compared to the baseline client version (244). For example, changes may have been made and saved to the current server version (240) by the other client systems (232) since the time that the baseline client version (244) was stored. Likewise, the change detection component (264) can parse and compare the current client version (242) with the baseline client version (244) to detect changes made to the current client version (242).

The change detection component (264) may operate in some other manner. For example, rather than directly parsing and comparing the different versions (242, 244, 246), the change detection may inspect one or more other data structures that track changes to the current client version (242) and/or the current server version (240) as those changes are made. The change detection component (264) may insert indications of the detected changes in a data structure, such as the merge tree (250). The merge tree (250) can indicate the detected changes, and can correlate those changes with portions of the document.

The conflict detection component (268) can detect conflicts between changes in the server version copy (246) and the current client version (242) of the document. For example, the conflict detection component (268) may examine the merge tree (250) to identify sets of changes indicted therein where a server change and a client change both change the same document property to different values. For example, the current client version (242) may have a box shape on a page being larger than the same box shape in the baseline client version (244), while the server version copy (246) may have that same box shape being smaller than the same box in the baseline client version (244). In such a situation, there is a conflict because the server's change (which may have been initiated by one of the other client systems (232)) and the client system's change will not both be made in the updated version (248) because of differences between the changes. Many other similar situations may arise where graphical changes conflict because of different sizes, shapes, colors, positions, etc. between changes made in the current client version (242) and the server version copy (246), as compared to the baseline client version (244). The conflict detection component (268) may detect conflicts in some other manner, such as by using separate data structures showing changes for the current client version (242) and the server version copy (246), respectively.

The change application component (266) can apply, or merge, changes into one or more versions of the document. For example, the change application component (266) can apply non-conflicting changes (those that were not found to conflict by the conflict detection component (268)) to the updated version (248) of the document. The change application component (266) can apply such changes in a traditional manner, such as by making substitutions, additions, and/or deletions for properties in the document version to which the changes are being applied.

The conflict categorization component (270) can categorize the conflicting changed that are identified by the conflict detection component (268). The conflict categorization component (270) can do this by applying one or more computer-readable rules, such as non-changeable rules integrated into code in the client application (260), user-changeable rules in settings in the client application (260), rules set forth in other data structures accessed by the client application (260), etc. This categorizing can ultimately be used to determine whether changes are to be automatically resolved, or manually resolved, as is discussed below. For example, the conflict categorization component (270) may group conflicts into those that are more likely to result in significant data loss and those that are less likely to result in significant data loss, with those that are less likely to result in loss of data being slated for automatic conflict resolution and those that are more likely to result in loss of data being slated for manual conflict resolution. The categorization rules may group conflicts by the type of conflicting changes, the magnitude of changes made by the conflicting changes, or both . . . .

The conflict categorization component (270) can indicate to the automatic conflict resolution component (272) which change conflicts are to be resolved automatically, and can indicate to the manual conflict resolution component (274) which changes are to be resolved manually.

The automatic conflict resolution component (272) can resolve conflicts that are slated for automatic conflict resolution by the conflict categorization component (270). For example, the automatic conflict resolution component (272) may resolve such conflicts using one or more computer-readable rules that are hard coded into the client application (260), that are included as changeable settings, and/or that are stored in some other manner. For example, a rule may dictate that the last client system (230 or 232) to save to the server (210) wins. In this case, the automatic conflict resolution component (272) can resolve conflicts by applying the change from the current client version (242) in the updated version (248). Alternatively, a rule may dictate that the server changes win, in which case the automatic conflict resolution component (272) can resolve conflicts by applying the change from the server version copy in the updated version (248). The automatic conflict resolution component (272) may apply changes directly and/or by invoking the change application component (266).

The manual conflict resolution component (274) can resolve conflicts that are slated for manual conflict resolution by the conflict categorization component (270), and can do so by applying selections provided by user input. The manual conflict resolution component (274) can generate a conflicts-client applied version (280) of the document, which can be generated by using the updated version (248) to which non-conflicting changes and changes slated for automatic conflict resolution have already been applied, and applying the changes from the current client version (242) for the conflicting changes that are slated for manual conflict resolution. The manual conflict resolution component (274) can do this directly or by invoking the change application component (266)). Similarly, the manual conflict resolution component (274) can generate a conflicts-server applied version (280) of the document, which can be generated by using the updated version (248) to which non-conflicting changes and changes slated for automatic conflict resolution have already been applied, and applying the changes from the server version copy (246) for the conflicting changes that are slated for manual conflict resolution (either directly or by invoking the change application component (266)). Each of the conflicts-client applied version (280) and the conflicts-server applied version (282) may include the entire document, or only a portion of the document. For example, these document versions may omit data that is not to be used in displaying pages of the document where conflicting changes that are slated for manual resolution appear in the document.

The manual conflict resolution component (274) can initiate the display of portions of the conflicts-client applied version (280) and the conflicts-server applied version (282) that can graphically illustrate the changes that have been applied in the respective conflicts-client applied version (280) or the conflicts-server applied version (282), as well as changes that have been applied in both versions (non-conflicting conflicts and conflicts slated for automatic conflict resolution). As an example, for each page of the document that includes conflicting changes to be manually resolved, part or all of the pages from both of these versions can be displayed at the same time. For example, all the graphical features of a page can be shown, or only one or more portions of the page that include these conflicting change(s) may be displayed. The corresponding portions (page or portion of a page) from both versions may be displayed at the same time (side-by-side, or top-and-bottom, etc.). Alternatively, one version of a portion may be shown at a time, and the display may toggle between the two versions, either automatically (e.g., periodically switching between views) or in response to user input.

Figure 3:
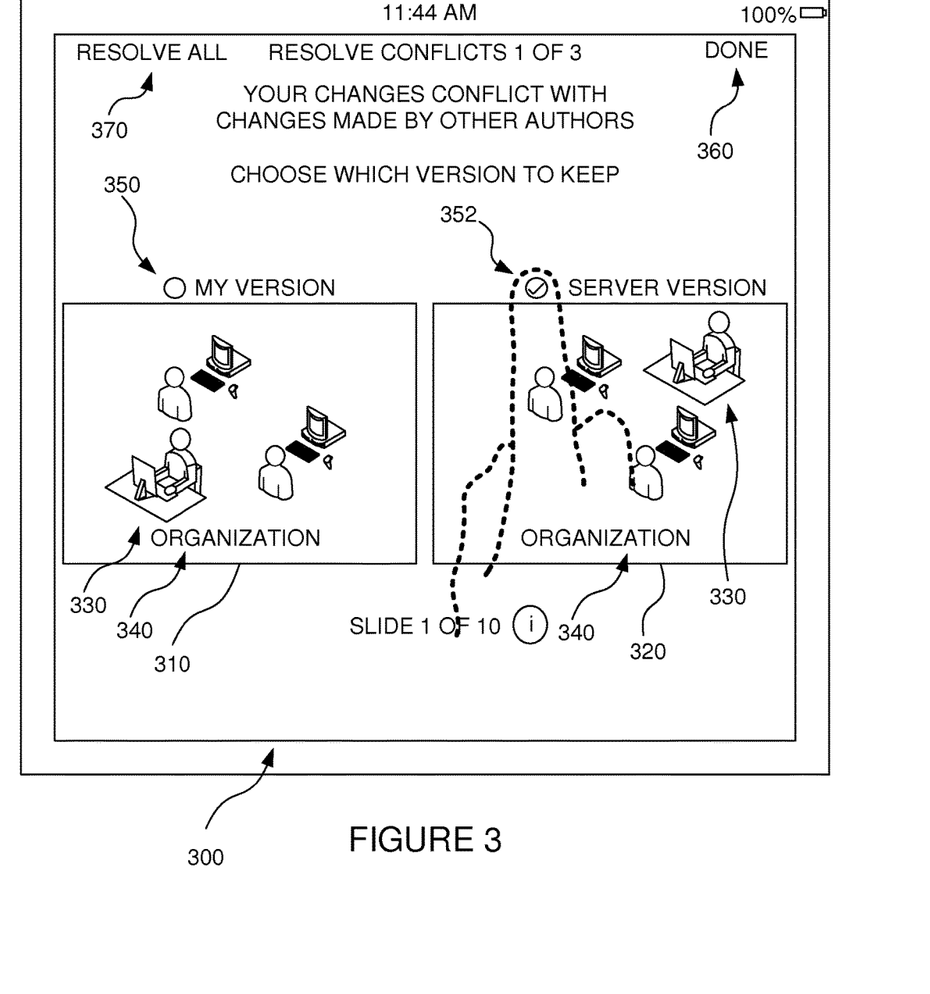
FIG. 3 is an illustration of an example user interface display showing illustrations of client and server versions of a document page, and allowing user input to choose between the versions to resolve conflicts between changes in the different versions.

Referring now to FIG. 3, an example of a display (300) is illustrated. The display (300) can include a client illustration (310) that illustrates a page of a conflicts-client applied version (280). The display (300) can also include a server illustration (320) that illustrates a page of a conflicts-server applied version (282). As shown, the client illustration (310) and the server illustration (320) are side-by side. The two versions have moved a graphical shape (330) to two different positions, both of which are different from a position of the graphical shape in a baseline client version (244) (not shown in FIG. 3).

The display (300) can also include a client selection control (350) and a server selection control (352), which can be selected by user input to select between the client illustration (310) and the server illustration (320). As illustrated in FIG. 3, a user's finger (shown in dashed lines) is used to select the server selection control (352) with touch input, but other types of user input may be used. To confirm the selection, a user may select the "DONE" control (360). Such user input can signal the manual conflict resolution component (274) (FIG. 2) to apply the changes from the conflicts-server applied version (282) for this page in the updated version (248). In response, the manual conflict resolution component (274) can also display the next page or portion of a page with conflicting changes.

Also, the display (300) can include a resolve all control (370), which can signal the manual conflict resolution component (274) to resolve all unresolved conflicts that are slated for manual resolution, according to the selection of the client selection control (350) or the server selection control (352). In one implementation, selection of the resolve all control (370) does not affect changes that have already been resolved in previous displays (for previous pages of the document). However, it can resolve all unresolved conflicts that would have appeared in subsequent pages. In this way, a user can forego the manual selection on each page if the user is certain that the selection will choose the same version (client or server) for each page.

When the manual conflict resolution component (274) has resolved all conflicts that are slated for manual resolution, the first client system (230) can upload the updated version (248) to the server (210). The server (210) can determine whether the current server version (240) has changed since the server version copy (246) was sent to the first client system (230). If not, then the server (210) can replace the current server version (240) with the updated version (248) of the document, which can then be used as the current server version (240). Accordingly, at this point, the changes in the current client version (242) and the current server version (240) are merged and saved as the new current server version (240). In response to being notified that the updated version (248) was successfully saved to the server (210), the first client system (230) can also save the updated version (248) as the baseline client version (244) and as the current client version (242).

Referring back to FIG. 2, components of the environment (200) can communicate in different ways, such as by using network messages (e.g., HTTP messages, etc.), sending application programming interface calls, sending function calls, or even storing information in data structures, which can then accessed by another component to receive the communication. The client application (260), the client document versions (242, 244, 246, 248, 280, and 282), and the merge tree (250) may all be stored in memory in the first client system (230), or may be distributed in some other manner. Also, some of the functions of the first client system (230) may be performed by the server (210), or by some other computer system. For example, the first client system (230) and the server (210) could each provide their versions of the document to another system, which could merge changes, including resolving conflicts. Such a third party system could communicate conflict changes that are slated for manual resolution to the first client system (230), and the first client system (230) could receive user input selecting changes to resolve the conflicts, and communicate such selections to the third party system. Likewise, at least some of the conflict resolution could be performed by the server (210).

The features of the components discussed above in FIG. 2 can provide technical benefits that can improve the usability and functioning of the computer environment (200). For example, showing conflicting graphical changes at the same time and/or showing all the graphical elements of a document page with changes made can make it easier for a user to compare the effects of those changes and make a simple decision as to which version of the page and/or change(s) to select. Also, by automatically resolving some conflicts but manually resolving other conflicts, user input can be requested to resolve conflicts in appropriate circumstances, but the user's decisions can be simplified because some conflicts can be resolved prior to presenting other conflicts for manual resolution.

III. Document Saving Coauthoring Conflict Resolution Technique Example

Figure 4:
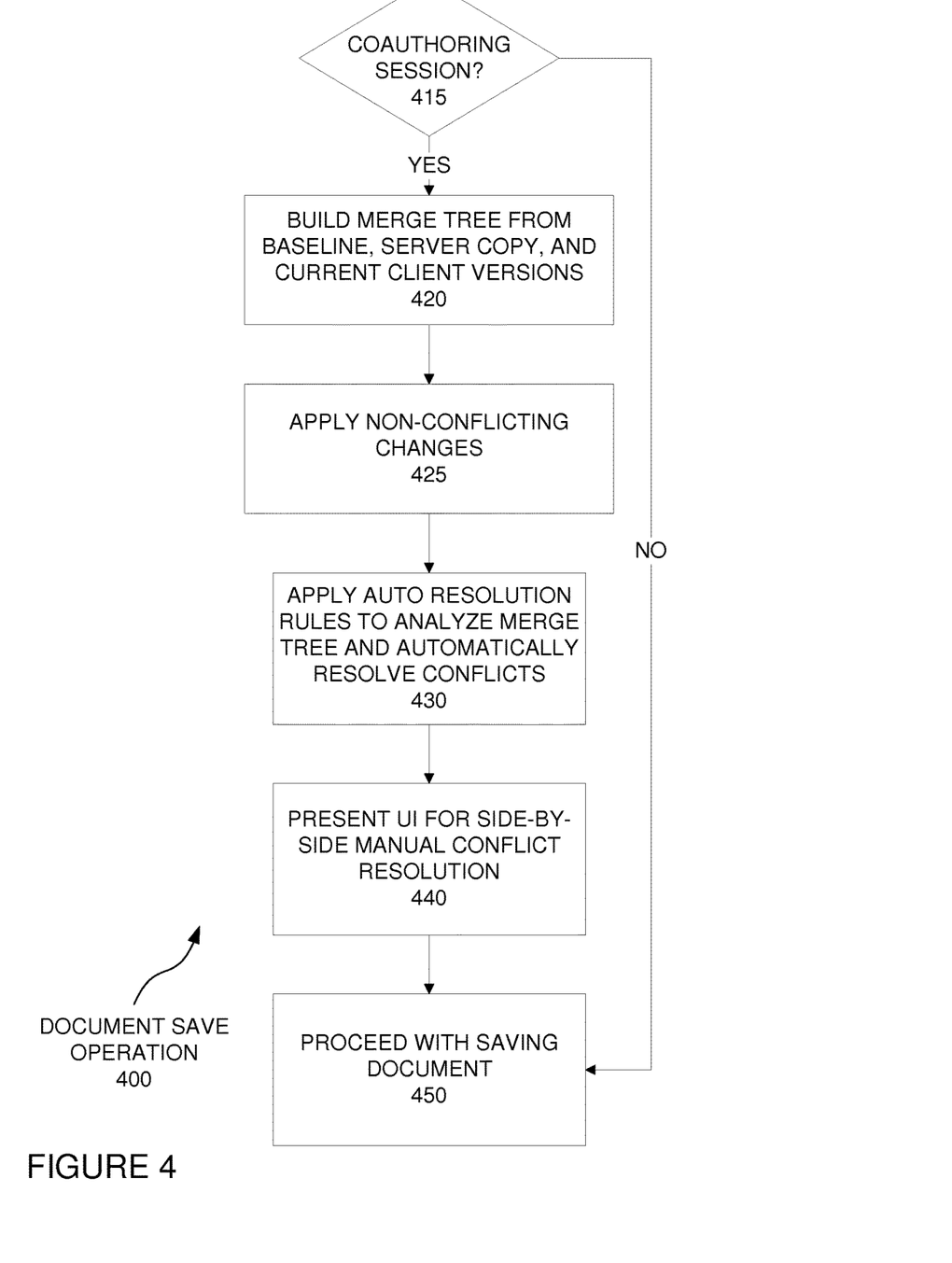
FIG. 4 is a flowchart of a technique for performing coauthoring conflict resolution as part of a document save operation.

Referring now to FIG. 4, a technique for performing coauthoring conflict resolution as part of a document save operation (400) will be discussed. The save operation (400) may be performed in a computing environment, such as the environment (200) discussed above with reference to FIG. 2. The operation (400) can include determining (415) whether the save operation (400) is part of a coauthoring session. For example, this could occur by examining a flag that can be set to indicate that a coauthoring session is occurring. Alternatively, the determination (415) may include determining whether a current server version of the document has been altered since a baseline version of the document was current (e.g., when the client's version and the server's version were last confirmed to be the same). For example, server records may be examined, or the current server version may be compared with a baseline version of the document.

If the save operation (400) is not part of a coauthoring session, then the system can proceed with saving (450) the document. If the save operation (400) is part of a coauthoring session, then a merge tree can be built (420) from a baseline version, server copy, and current client version of a document to be saved to a server. Additionally, non-conflicting changes can be applied (425) to an updated version of the document. Also, automatic conflict resolution rules can be applied (430) to analyze the merge tree and automatically resolve conflicts that are slated for automatic resolution. Moreover, a user interface, such as the display example illustrated in FIG. 3, can be presented (440) for side-by-side manual conflict resolution (which can also include receiving user input in response to presenting (440) the user interface). The document save operation (400) can then proceed with saving (450) the document.

IV. Digital Document Change Conflict Resolution Techniques

Several digital document change conflict resolution techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 5:
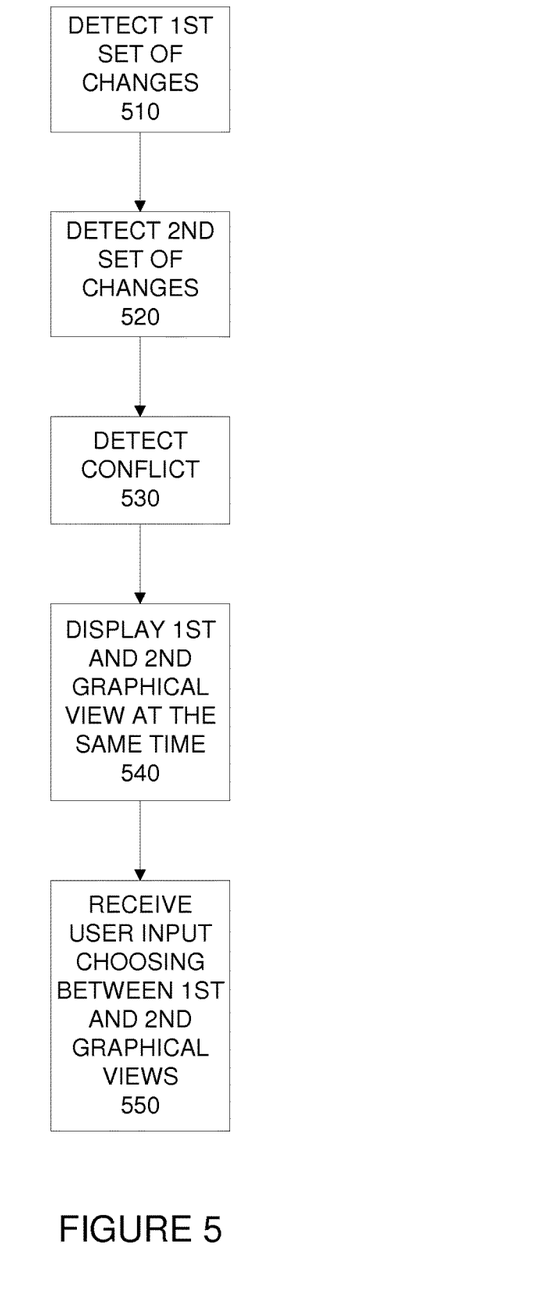
FIG. 5 is a flowchart of a digital document change conflict resolution technique.

Referring to FIG. 5, a digital document change conflict resolution technique will be described. The technique can include detecting (510) a first set of changes to a first version of the document. The first set of changes can include a first graphical change (as opposed to a non-visual or purely textual change) to a page of the document in the first version of the document, as compared to the baseline version of the document. The technique can further include detecting (520) a second set of changes to a second version of the document, as compared to the baseline version of the document. The second set of changes can include a second graphical change to the page of the document in the second version of the document, as compared to the baseline version of the document. Moreover, the technique can include detecting (530) a conflict between the first graphical change and the second graphical change. The technique can further include displaying (540) at the same time a first graphical view of at least a portion of the page with the first graphical change having been made and a second graphical view of at least a portion of the page with the second graphical change having been made. Additionally, user input can be received (550), with the user input choosing between the first graphical view and the second graphical view. In response to such input, the technique may further include applying conflicting changes from the chosen graphical view, and rejecting changes illustrated in the non-chosen graphical view, unless such changes are also illustrated in the chosen graphical view.

The first and second graphical views can each display all graphical features on the page, meaning all graphical features on the page for the version being represented by the associated graphical view.

The first set of changes can include a third change, as compared to the baseline version of the document, and the second set of changes can include a fourth change, as compared to the baseline version of the document. The technique can further include detecting a conflict between the third change and the fourth change. The technique can also include determining that the conflict between the third change and the fourth change is to be resolved by applying at least one computer-readable conflict resolution rule. Additionally, the technique of FIG. 5 can include accepting the third change and rejecting the fourth change, with the acceptance of the third change and rejection of the fourth change including applying the computer-readable conflict resolution rule(s) to the conflict between the third and fourth changes. Moreover, acceptance of the third change and rejection of the fourth change can be illustrated in the first graphical view and the second graphical view.

Also, determining that the conflict between the third change and the fourth change is to be resolved by applying the at least one computer-readable conflict resolution rule can include categorizing the third change and the fourth change as a type of change that is to be resolved by applying the at least one conflict resolution rule. In this aspect, determining that the conflict between the third change and the fourth change is to be resolved by applying the at least one computer-readable conflict resolution rule can include distinguishing between page-level changes and document level changes, and wherein categorizing the third change and the fourth change as a type of change that is to be resolved by applying the at least one conflict resolution rule includes categorizing the third change and the fourth change as document level changes. Moreover, the technique can include determining that the conflict between the first and second changes is to be resolved by user input. This determination can include distinguishing between page-level changes and document level changes, and categorizing the first change and the second change as page-level changes.

The first graphical change and the second graphical change can be different changes to a property of the document. For example, the property may be a property of a graphical shape on a page, such as position, size, orientation, or color of a change.

Figure 6:
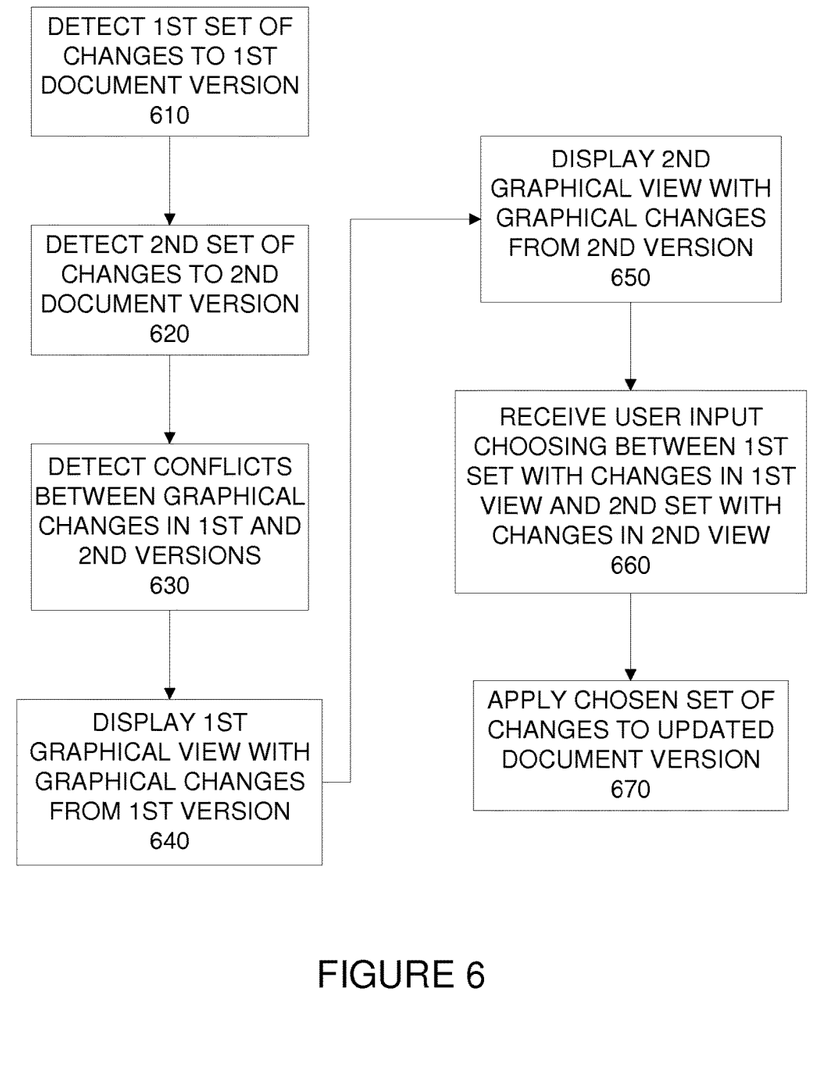
FIG. 6 is a flowchart of another digital document change conflict resolution technique.

Referring now to FIG. 6, another digital document change conflict resolution technique will be described. The technique can include detecting (610) a first set of changes to a first version of a digital document, as compared to a baseline version of the document. The first set of changes can include multiple graphical changes to a page of the document in the first version of the document, as compared to the baseline version of the document. The FIG. 6 technique can further include detecting (620) a second set of changes to a second version of a document, as compared to the baseline version of the document, with the second set of changes including multiple graphical changes to the page of the document in the second version of the document, as compared to the baseline version of the document.

The FIG. 6 technique can also include detecting (630) multiple conflicts between the graphical changes in the first version of the document and the graphical changes in the second version of the document. Moreover, the technique of FIG. 6 can include displaying (640) a first continuous graphical view illustrating at least a portion of the page with multiple conflicting graphical changes in the first version of the document having been made, and displaying (650) a second continuous graphical view illustrating at least a portion of the page with multiple conflicting graphical changes in the second version of the document having been made. The FIG. 6 technique can further include receiving (660) user input choosing a chosen selection set as between a first selection set including the multiple graphical changes illustrated in the first graphical view and a second selection set including the multiple graphical changes illustrated in the second graphical view. The technique can also include applying (670) the chosen selection set to an updated version of the document.

The first graphical view in the FIG. 6 technique can be a graphical view displaying a version of all graphical features on the page, and the second graphical view can be a graphical view displaying a version of all graphical features on the page. Also, the displaying of the first and second graphical views can be done at the same time, such as in a side-by-side view.

In the FIG. 6 technique, the first set of changes can include a third change, as compared to the baseline version of the document, and the second set of changes can include a fourth change, as compared to the baseline version of the document. Also, the technique can further include detecting a conflict between the third change and the fourth change, and determining that the conflict between the third change and the fourth change is to be resolved by applying at least one computer-readable conflict resolution rule. The determination that that the conflict between the third change and the fourth change is to be resolved by applying the at least one computer-readable conflict resolution rule can include categorizing the third change and the fourth change as a type of change that is to be resolved by applying the at least one conflict resolution rule. Also, the technique can include accepting the third change and rejecting the fourth change, where the acceptance of the third change and rejection of the fourth change can include applying the at least one computer-readable conflict resolution rule to the conflict between the third and fourth changes and where the acceptance of the third change and rejection of the fourth change can be illustrated in the first graphical view and the second graphical view.

Figure 7:
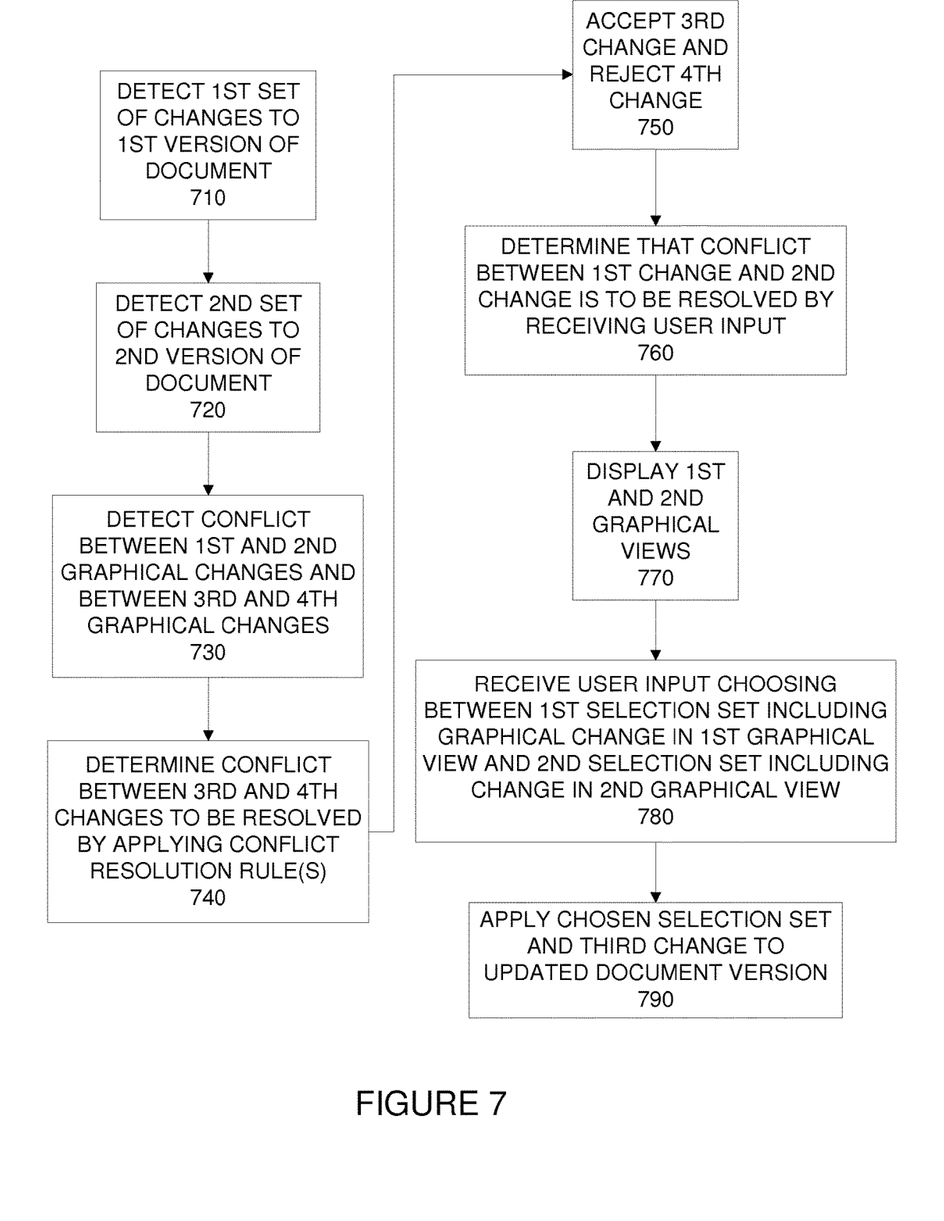
FIG. 7 is a flowchart of yet another digital document change conflict resolution technique.

Referring now to FIG. 7, yet another digital document change conflict resolution technique will be described. The technique can include detecting (710) a first set of changes to a first version of a digital document, as compared to a baseline version of the document, with the first set of changes including a first graphical change to a page of the document in the first version of the document, as compared to the baseline version of the document. The technique can also include detecting (720) a second set of changes to a second version of a document, as compared to the baseline version of the document. The second set of changes can include a second graphical change to the page of the document in the second version of the document, as compared to the baseline version of the document. Also, the first set of changes can further include a third change, as compared to the baseline version of the document, and the second set of changes can further include a fourth change, as compared to the baseline version of the document. The technique can further include detecting (730) a conflict between the first graphical change and the second graphical change, as well as a conflict between the third change and the fourth change.

The FIG. 7 technique can include determining (740) that the conflict between the third change and the fourth change is to be resolved by applying at least one computer-readable conflict resolution rule. The determination (740) can include categorizing the third change and the fourth change as a type of change that is to be resolved by applying the at least one conflict resolution rule. The technique of FIG. 7 can further include accepting the third change and rejecting the fourth change. The acceptance of the third change and rejection of the fourth change (750) can include applying the at least one computer-readable conflict resolution rule to the conflict between the third and fourth changes. The FIG. 7 technique can further include determining (760) that the conflict between the first change and the second change is to be resolved by receiving user input. The FIG. 7 technique can further include displaying (770) a first graphical view of at least a portion of the page with the first graphical change having been made and a second graphical view of at least a portion of the page with the second graphical change having been made. The acceptance of the third change and the rejection of the fourth change can be illustrated in the first graphical view and the second graphical view. Also, user input can be received (780). The user input can choose a chosen selection set as between a first selection set that can include the first graphical change and a second selection set that can include the second graphical change. The chosen selection set and the third change can be applied (790) to an updated version of the document.

Determining (740) that the conflict between the third and fourth changes is to be resolved by applying the computer-readable conflict resolution rule(s) can include distinguishing between page-level changes and document level changes. Also, categorizing the third change and the fourth change as a type of change that is to be resolved by applying the at least one conflict resolution rule can include categorizing the third change and the fourth change as document level changes. Determining (760) that the conflict between the first change and the second change is to be resolved by user input can include distinguishing between page-level changes and document level changes, and categorizing the first change and the second change as page-level changes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
    detecting a conflict between a first change to a content portion of a digital document and a second change to the content portion of the digital document;
    determining whether the conflict between the first change and the second change is to be resolved automatically or whether the conflict requires manual user input to be resolved based on an application of conflict resolution logic that comprises applying at least one conflict rule to evaluate how the content portion is affected based on the first change and the second change;
    automatically resolving the conflict based on a determination, by the conflict resolution logic, that the conflict relates to a property affecting presentation of the content portion; and
    providing a manual resolution prompt for a user to manually resolve the conflict based on a determination, by the conflict resolution logic, that the conflict results in an amount of data loss to the content portion.

2. The computer-implemented method of claim 1, wherein the property of the content portion is one or more selected from a group consisting of: a position, an orientation, a formatting and a size.

3. The computer-implemented method of claim 2, wherein the conflict resolution logic selects the at least one conflict rule based on a classification of the conflict as a page-level conflict.

4. The computer-implemented method of claim 1, wherein when data loss is detected as a result of the conflict, the conflict resolution logic executes a threshold analysis associated with the amount of data loss.

5. The computer-implemented method of claim 4, wherein the conflict resolution logic automatically resolves the conflict when the amount of data loss is below a threshold value based on the threshold analysis.

6. The computer-implemented method of claim 4, wherein the conflict resolution logic requires manual resolution to resolve the conflict when the amount of data loss exceeds a threshold value based on the threshold analysis.

7. The computer-implemented method of claim 1, further comprising providing, within the digital document, a notification of an automatically resolved conflict.

8. The computer-implemented method of claim 7, wherein the notification comprises identification of an unselected change.

9. The computer-implemented method of claim 1, wherein the manual resolution prompt comprises a side-by-side comparison of the first change and the second change for a user to make a selection to resolve the conflict.

10. A computer system comprising:
    at least one processor; and
    a memory, operatively connected with the at least one processor, that comprises instructions stored thereon that, when executed by at least one processor, causes the at least one processor to perform a method that comprises:
        detecting a conflict between a first change to a content portion of a digital document and a second change to the content portion of the digital document,
        determining whether the conflict between the first change and the second change is to be resolved automatically or whether the conflict requires manual user input to be resolved based on an application of conflict resolution logic that comprises applying at least one conflict rule to evaluate how the content portion is affected based on the first change and the second change,
        automatically resolving the conflict based on a determination, by the conflict resolution logic, that the conflict relates to a property affecting presentation of the content portion; and
        providing a manual resolution prompt for a user to manually resolve the conflict based on a determination, by the conflict resolution logic, that the conflict results in an amount of data loss to the content portion.

11. The computer system of claim 10, wherein the property of the content portion is one or more selected from a group consisting of: a position, an orientation, a formatting and a size.

12. The computer system of claim 10, wherein the conflict resolution logic selects the at least one conflict rule based on a classification of the conflict as a page-level conflict.

13. The computer system of claim 10, wherein the method, executed by the at least one processor, further comprises providing, within the digital document, a notification of an automatically resolved conflict.

14. The computer system of claim 13, wherein the notification comprises identification of an unselected change.

15. The computer system of claim 10, wherein when data loss is detected as a result of the conflict, the conflict resolution logic executes a threshold analysis associated with the amount of data loss, and wherein the conflict resolution logic is configured to:
    automatically resolve the conflict when the amount of data loss is less than or equal to a threshold value based on the threshold analysis, and
    require manual resolution to resolve the conflict when the amount of data loss exceeds the threshold value based on the threshold analysis.

16. One or more non-transitory computer-readable memory having computer-executable instructions embodied thereon that, when executed by at least one processor, causes the at least one processor to execute a method comprising:
    detecting a conflict between a first change to a content portion of a digital document and a second change to the content portion of the digital document;
    determining whether the conflict between the first change and the second change is to be resolved automatically or whether the conflict requires manual user input to be resolved based on an application of conflict resolution logic that comprises applying at least one conflict rule to evaluate how the content portion is affected based on the first change and the second change;
    automatically resolving the conflict based on a determination, by the conflict resolution logic, that the conflict relates to a property affecting presentation of the content portion; and
    providing a manual resolution prompt for a user to manually resolve the conflict based on a determination, by the conflict resolution logic, that the conflict results in an amount of data loss to the content portion.

17. The one or more non-transitory computer-readable memory of claim 16, wherein the property of the content portion is one or more selected from a group consisting of: a position, an orientation, a formatting and a size.

18. The one or more non-transitory computer-readable memory of claim 16, wherein the conflict resolution logic selects the at least one conflict rule based on a classification of the conflict as a page-level conflict.

19. The one or more non-transitory computer-readable memory of claim 16, wherein the method, executed by the at least one processor, further comprises providing, within the digital document, a notification of an automatically resolved conflict.

20. The one or more non-transitory computer-readable memory of claim 16, wherein when data loss is detected as a result of the conflict, the conflict resolution logic executes a threshold analysis associated with the amount of data loss, and wherein the conflict resolution logic is configured to:
   automatically resolve the conflict when the amount of data loss is less than or equal to a threshold value based on the threshold analysis, and
   require manual resolution to resolve the conflict when the amount of data loss exceeds the threshold value based on the threshold analysis.

\* \* \* \* \*